UNITED STATES PATENT OFFICE.

ALBION J. WADHAMS, OF RIVERTON, NEW JERSEY, AND ROBERT C. STANLEY, OF NEW BRIGHTON, NEW YORK, ASSIGNORS TO INTERNATIONAL NICKEL COMPANY, OF BAYONNE, NEW JERSEY, A CORPORATION OF NEW JERSEY.

ART OF SEPARATING METALS FROM SPEISS.

No. 900,454.

Specification of Letters Patent.

Patented Oct. 6, 1908.

Application filed February 16, 1907. Serial No. 357,720.

*To all whom it may concern:*

Be it known that we, ALBION J. WADHAMS, of Riverton, county of Burlington, and State of New Jersey, and ROBERT C. STANLEY, of New Brighton, county of Richmond, and State of New York, have invented an Improvement in the Art of Separating Metals from Speiss, of which the following is a specification.

The purpose of our invention is to provide a cheap and effective means for the separation of copper, nickel, cobalt and silver from arsenic and other elements with which they are associated in speiss or other arsenical matte, and to separate the silver from the copper, nickel, cobalt and iron. The processes heretofore employed for this purpose have been difficult and to a large extent wasteful, but our process reduces the cost to a very small amount and provides means by which the values are recovered with little or no waste.

Our invention is applicable to matte containing nickel, cobalt, silver and iron, whether copper is contained therein or not.

We first eliminate the arsenic from the other metals of the speiss. This we accomplish by roasting the speiss or concentrate in a calcining furnace at a cherry red heat until arsenical fumes cease to be liberated therefrom. We then take the calcined material, grind it with carbon preferably in the form of coal or charcoal, and roast the mixture in a reducing atmosphere, which reduces the arsenical compounds into arsenids, and we then subject the mixture to an oxidizing roast which liberates arsenic fumes. The alternate reduction and oxidation are repeated in this manner until fumes of arsenic cease to be liberated. If this operation is carried to the limit, material which originally contained 35 per cent. arsenic, 16 per cent. nickel, 25 per cent. cobalt, and 10 per cent. iron, will contain about 4 per cent. of arsenic. To eliminate this residue we preferably proceed as follows: We mix the material with nitrate of soda and soda ash which are employed preferably in the proportion of 1 part of nitrate of soda and two parts of soda ash to one part of arsenic contained in the compound, and we then calcine the mixture in a furnace, preferably at a cherry red heat, until all of the arsenic is converted into arsenate of soda. Any of the other soda salts, such as caustic soda, carbonate of soda, may be used, which when heated will combine with the arsenic to form arsenate of soda. We then withdraw the material from the furnace and wash it, preferably in a washtank, although we may employ mechanical stirrers or a filtering apparatus, until the arsenate of soda has been dissolved. We then prefer to concentrate the solution by evaporation and remove the arsenate of soda by crystallization, as it is a valuable product.

The undissolved material is separated and dried with heated air, and by the treatment above described the percentage of arsenic can be brought to as low as one-half of one per cent. The residual material consists of oxides of copper, nickel, cobalt and iron, together with other oxids such as silicon, aluminum and calcium, and metallic silver, but it is substantially free from arsenic or arsenate of soda. The material is then dissolved in hydrochloric acid, which is preferably concentrated, and in order to obtain the most rapid and effective solution we prefer to perform it in a revolving cylinder under pressure and with the influence of heat. We have obtained suitable results with an internal pressure in the cylinder of about 60 to 80 pounds, the acid being heated to about 135° F. and the treatment continued from six to eight hours. The hydrochloric acid dissolves the chlorids of the several metals except the silver, only a part of which will dissolve therein, the residue remaining undissolved as a chlorid. The undissolved silver and silver chlorid are allowed to settle for subsequent removal and smelting, and the solution is then drawn off and treated for the removal of the iron. For this purpose we prefer to mix the solution with an alkali, preferably caustic lime, which precipitates the iron as a hydrate and also removes the last of the arsenic, but holds the silver in solution. The solution, freed from iron and still acid, is treated for the removal of copper and silver by passing sulfureted hydrogen through it, which precipitates the copper and silver as sulfids; or the solution may be passed over copper or zinc, on which the silver will deposit by cementing. The precipitate of silver and copper sulfids, or cemented silver, may be washed and collected and smelted in a furnace. After this treatment the solution contains chlorids of nickel and cobalt, and can be treated by known methods for the separation of these metals as oxids.

We claim:

The method herein described of removing arsenic from speiss, which consists in alternately subjecting the speiss to oxidizing and reducing roasts, then completing the removal of arsenic by roasting the material with a sodium compound capable of combining with the arsenic to form an arsenate, thus converting the arsenic into arsenate of soda; substantially as described.

In testimony whereof, we have hereunto set our hands.

ALBION J. WADHAMS.
ROBT. C. STANLEY.

Witnesses:
GEORGE H. SONNEBORN,
ANNA E. WALLACE.